(12) United States Patent
Murakami et al.

(10) Patent No.: US 9,882,444 B2
(45) Date of Patent: Jan. 30, 2018

(54) ROTATING ELECTRICAL MACHINE HAVING A STRUCTURE FOR SUPPORT OF A BUS BAR AND TERMINAL BLOCK

(71) Applicant: Mitsubishi Electric Corporation, Tokyo (JP)

(72) Inventors: Tadashi Murakami, Tokyo (JP); Kouichi Ojima, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 60 days.

(21) Appl. No.: 14/649,978

(22) PCT Filed: Apr. 19, 2013

(86) PCT No.: PCT/JP2013/061627
§ 371 (c)(1),
(2) Date: Jun. 5, 2015

(87) PCT Pub. No.: WO2014/171006
PCT Pub. Date: Oct. 23, 2014

(65) Prior Publication Data
US 2015/0340919 A1 Nov. 26, 2015

(51) Int. Cl.
*H02K 3/28* (2006.01)
*H02K 11/00* (2016.01)
(Continued)

(52) U.S. Cl.
CPC ............... *H02K 3/28* (2013.01); *H02K 3/522* (2013.01); *H02K 5/225* (2013.01); *H02K 11/0094* (2013.01); *H02K 2203/09* (2013.01)

(58) Field of Classification Search
CPC ........... H02K 3/28; H02K 3/522; H02K 5/22; H02K 5/225; H02K 11/0094; H02K 2203/09
(Continued)

(56) References Cited

U.S. PATENT DOCUMENTS 5,828,147 A * 10/1998 Best ....................... H02K 3/522
310/71
5,986,374 A 11/1999 Kawakami
(Continued)

FOREIGN PATENT DOCUMENTS

CN 1720653 A 1/2006
JP 09-200991 A 7/1997
(Continued)

OTHER PUBLICATIONS

International Search Report for PCT/JP2013/061627 dated Jul. 30, 2013 [PCT/ISA/210].
(Continued)

*Primary Examiner* — Bernard Rojas
*Assistant Examiner* — Rashad Johnson
(74) *Attorney, Agent, or Firm* — Sughrue Mion, PLLC; Richard C. Turner

(57) ABSTRACT

A terminal block is fixed to a frame holding a stator and in phase with the stator whereas a part of an outside wire is fixed to a case. Hence, a bus bar extracted from a connection plate is welded to the terminal block hardly under the influence of a tolerance caused by integration of components and a tolerance of assembly. Even when a load applied from the outside gives rise to a phase difference between the case and the frame, a tolerance can be absorbed by the outside wire. Accordingly, a load applied to a weld portion of the terminal block and the bus bar can be reduced.

5 Claims, 6 Drawing Sheets

(51) Int. Cl.
*H02K 5/22* (2006.01)
*H02K 3/52* (2006.01)

(58) Field of Classification Search
USPC .............................. 310/68 B, 68 C, 68 D, 71
See application file for complete search history.

(56) References Cited

U.S. PATENT DOCUMENTS

| | | | |
|---|---|---|---|
| 6,011,339 A | 1/2000 | Kawakami | |
| 6,300,697 B1* | 10/2001 | Findeisen | H02K 3/50 310/68 B |
| 7,034,419 B2* | 4/2006 | Kabasawa | H02K 3/522 310/260 |
| 7,193,344 B2* | 3/2007 | Kabasawa | B60K 6/26 180/65.22 |
| 7,262,529 B2* | 8/2007 | Klappenbach | H02K 3/522 310/71 |
| 7,374,462 B2* | 5/2008 | Kobayashi | H02K 3/522 310/71 |
| 7,705,505 B2* | 4/2010 | Kataoka | H02K 3/522 180/443 |
| 8,115,353 B2* | 2/2012 | Urano | H02K 3/18 310/71 |
| 8,136,623 B2* | 3/2012 | Takashima | B62D 5/0406 180/444 |
| 8,193,677 B2* | 6/2012 | Murakami | H02K 3/522 310/195 |
| 8,471,420 B2* | 6/2013 | Isogai | H02K 5/225 310/54 |
| 8,482,172 B2* | 7/2013 | Sasaki | H02K 3/522 310/180 |
| 8,487,491 B2* | 7/2013 | Elser | H02K 3/522 310/43 |
| 8,502,432 B2* | 8/2013 | Urano | H02K 3/522 310/179 |
| 8,633,620 B2* | 1/2014 | Kimmich | H02K 5/225 310/52 |
| 8,729,755 B2* | 5/2014 | Nakagawa | H02K 3/522 310/68 R |
| 8,878,407 B2* | 11/2014 | Ikura | H02K 3/522 29/598 |
| 9,011,112 B2* | 4/2015 | Tanahashi | F04D 5/002 310/71 |
| 9,444,293 B2* | 9/2016 | Yoshinori | H02K 1/185 |
| 2002/0047365 A1* | 4/2002 | Yagyu | H02K 3/50 310/71 |
| 2003/0006657 A1* | 1/2003 | Mimura | H02K 3/522 310/71 |
| 2003/0006666 A1* | 1/2003 | Mimura | H02K 3/522 310/71 |
| 2003/0201688 A1* | 10/2003 | Yamamura | H02K 3/50 310/71 |
| 2004/0070293 A1* | 4/2004 | Kabasawa | H02K 3/522 310/71 |
| 2004/0108778 A1* | 6/2004 | Tsukamoto | H02K 7/116 310/83 |
| 2005/0179329 A1* | 8/2005 | Okazaki | B62D 5/0403 310/71 |
| 2006/0043806 A1* | 3/2006 | Torii | H02K 3/522 310/71 |
| 2006/0091745 A1 | 5/2006 | Klappenbach et al. | |
| 2006/0208587 A1* | 9/2006 | Herlet | H02K 3/38 310/71 |
| 2007/0278876 A1* | 12/2007 | Haga | H02K 3/522 310/71 |
| 2008/0169713 A1* | 7/2008 | Kataoka | G01D 5/2013 310/71 |
| 2009/0026860 A1* | 1/2009 | Ohuchi | H02K 5/08 310/71 |
| 2009/0026870 A1* | 1/2009 | Hoshino | H02K 3/522 310/194 |
| 2009/0079280 A1* | 3/2009 | Terauchi | H02K 5/225 310/71 |
| 2009/0102312 A1* | 4/2009 | Tsukashima | H02K 3/522 310/215 |
| 2009/0152975 A1 | 6/2009 | Sasaki et al. | |
| 2009/0250287 A1* | 10/2009 | Takashima | B62D 5/0406 180/444 |
| 2009/0256439 A1* | 10/2009 | Inoue | H02K 3/522 310/71 |
| 2010/0187924 A1* | 7/2010 | Yagai | H02K 3/522 310/71 |
| 2010/0201212 A1* | 8/2010 | Urano | H02K 3/18 310/71 |
| 2011/0020154 A1* | 1/2011 | Matsuda | H02K 1/148 417/410.1 |
| 2012/0098363 A1* | 4/2012 | Elser | H02K 3/522 310/71 |
| 2012/0126646 A1* | 5/2012 | Nakagawa | H02K 3/522 310/71 |
| 2012/0212089 A1* | 8/2012 | Sakurada | H02K 5/225 310/71 |
| 2012/0286593 A1* | 11/2012 | Yokogawa | H02K 1/278 310/43 |
| 2013/0026888 A1* | 1/2013 | Migita | H02K 29/08 310/68 B |
| 2013/0049501 A1* | 2/2013 | Fujisaki | H02K 3/522 310/71 |
| 2013/0113313 A1* | 5/2013 | Ikura | H02K 3/522 310/71 |
| 2013/0264899 A1* | 10/2013 | Goto | H02K 3/50 310/71 |
| 2014/0028130 A1* | 1/2014 | Sonoda | H02K 3/28 310/71 |
| 2014/0070646 A1* | 3/2014 | Isoda | H02K 3/325 310/71 |
| 2014/0091655 A1* | 4/2014 | Kajita | H02K 3/522 310/71 |
| 2014/0354094 A1* | 12/2014 | Yazaki | H02K 3/522 310/71 |
| 2015/0188376 A1* | 7/2015 | Yamaguchi | H02K 3/522 310/71 |
| 2015/0229178 A1* | 8/2015 | Murakami | H02K 3/50 310/71 |
| 2015/0340919 A1* | 11/2015 | Murakami | H02K 5/225 310/71 |
| 2015/0357877 A1* | 12/2015 | Bessho | H02K 5/225 310/71 |
| 2015/0357878 A1* | 12/2015 | Fukunaga | H02K 3/50 310/71 |
| 2015/0357886 A1* | 12/2015 | Ishizeki | F04D 25/06 310/71 |
| 2016/0094106 A1* | 3/2016 | Yamasaki | H01R 12/57 310/71 |
| 2016/0156246 A1* | 6/2016 | Hotori | H02K 5/225 310/43 |
| 2016/0190887 A1* | 6/2016 | Sambuichi | H02K 3/522 310/71 |

FOREIGN PATENT DOCUMENTS

| | | |
|---|---|---|
| JP | 2004-222354 A | 8/2004 |
| JP | 2009-148026 A | 7/2009 |
| JP | 2013-062901 A | 4/2013 |

OTHER PUBLICATIONS

Communication dated Jan. 5, 2016 from the Japanese Patent Office in counterpart application No. 2015-512265.

Communication dated Mar. 27, 2017, from the State Intellectual Property Office of People's Republic of China in counterpart Application No. 201380075747.7.

\* cited by examiner

ROTATING ELECTRICAL MACHINE HAVING A STRUCTURE FOR SUPPORT OF A BUS BAR AND TERMINAL BLOCK

CROSS REFERENCE TO RELATED APPLICATIONS

This application is a National Stage of International Application No. PCT/JP2013/061627 filed Apr. 19, 2013, the contents of all of which are incorporated herein by reference in their entirety.

TECHNICAL FIELD

The present invention relates to a rotating electrical machine.

BACKGROUND ART

A coil of a rotating electrical machine is supplied with a current by welding a feed terminal of a bus bar extracted from a connection plate inside the rotating electrical machine to a connection terminal of a terminal block and by connecting this weld portion to an outside wire. The terminal block is fit to a case of the rotating electrical machine whereas a stator around which is wound the coil and the connection plate are fixed to a frame inside the case. For example, according to PTL 1, an outgoing line of the coil is welded to a ring-like wiring member disposed below the stator and the weld portion and a tip end of a lead wire are integrated with the case by molding.

CITATION LIST

Patent Literature

PTL 1: JP-A-9-200991

SUMMARY OF INVENTION

Technical Problem

When the feed terminal of the bus bar connected to the coil inside the rotating electrical machine is connected to the outside wire via the terminal block as described above, positions of tip ends of the both terminals may not be aligned due to the influence of a tolerance caused by integration of components during the assembly, and such misalignment makes it impossible to obtain an optimal joint state. In particular, in an example where the terminal block is fixed to or molded integrally with the case, welding the feed terminal of the bus bar to the connection terminal of the terminal block at a high degree of accuracy requires a mechanism that absorbs a positional tolerance of the case with respect to the frame, a tolerance of the frame, and a positional tolerance of the bus bar with respect to the connection terminal. On the other hand, making the tolerances stricter for the purpose of securing the reliability of assembly raises a problem that the cost is increased.

In addition, in an example as in PTL 1 where the terminal block (wiring member) is fit to the case whereas the stator around which is wound the coil and the connection plate are fixed to the frame different from the case, there is a problem that vibrations give rise to a phase difference between the stator and the terminal block and a load is applied to the weld portion of the bus bar extracted from the connection plate and the terminal block. In order to suppress such a load, it is necessary to provide a mechanism capable of preventing the occurrence of a phase difference between the frame to which the stator is fixed and the case to which the terminal block is fixed.

The invention was devised to solve the problems discussed above and has an object to provide a rotating electrical machine capable of reducing the influence of a tolerance caused by integration of components when a bus bar extracted from a connection plate is connected to a terminal block and also capable of preventing a load from being applied on a weld portion of a feed terminal and the terminal block.

Solution to Problem

A rotating electrical machine of the invention includes: a rotor provided on a peripheral surface of a rotary driving shaft; a stator oppositely spaced apart from an outer peripheral surface of the rotor and held inside a circular-cylindrical frame; a connection plate having a bus bar connected to one end of a coil wound around the stator and an insulating holder, the bus bar including a plurality of bus bars laminated in a radial direction and the insulating holder holding a plurality of the bus bars; a terminal block having a connection terminal to which is welded the bus bar extracted from the connection plate to electrically connect an outside wire that supplies the coil with power and the bus bar; and a case storing the frame and the terminal block. The rotating electrical machine is characterized in that a part of the outside wire is fixed to the case and the terminal block is directly or indirectly fixed to the frame.

Advantageous Effects of Invention

A rotating electrical machine of the invention has a terminal block that is in phase with a frame and a stator. Owing to this configuration, a bus bar is welded to the terminal block hardly under the influence of a tolerance caused by integration of components. Hence, assembly becomes easier and the manufacturing costs can be reduced. In addition, a part of an outside wire is fixed to a case. Hence, even when a phase difference occurs between the case and the frame, a tolerance can be absorbed by the outside wire. Consequently, a load applied to a weld portion of the terminal block and the bus bar can be reduced.

The above and other objects, characteristics, viewpoints, and advantageous effects of the present invention will become more apparent from the following detailed description taken in conjunction with the accompanying drawings.

DESCRIPTION OF EMBODIMENTS

First Embodiment

Figure 1:
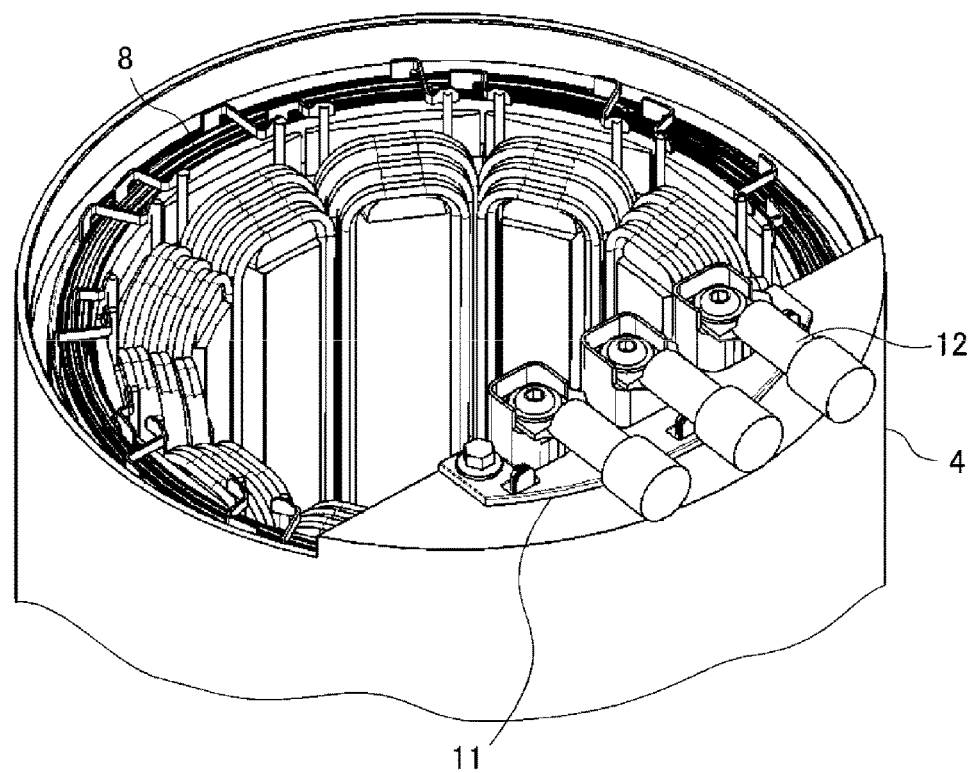
FIG. 1 is a perspective view of a rotating electrical machine according to a first embodiment of the invention.
Figure 2:
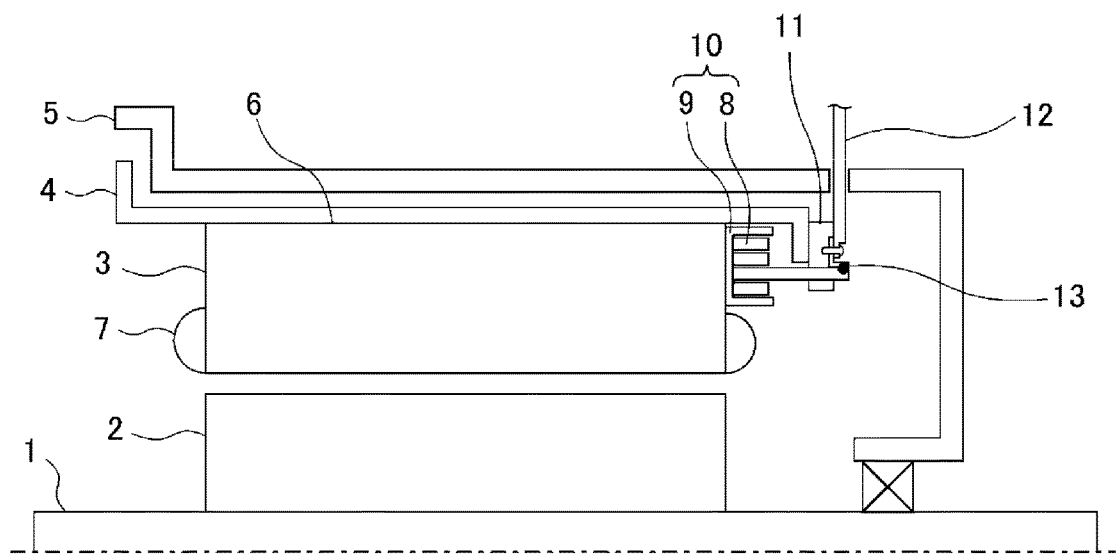
FIG. 2 is an axial cross section of the rotating electrical machine according to the first embodiment of the invention.
Figure 3:
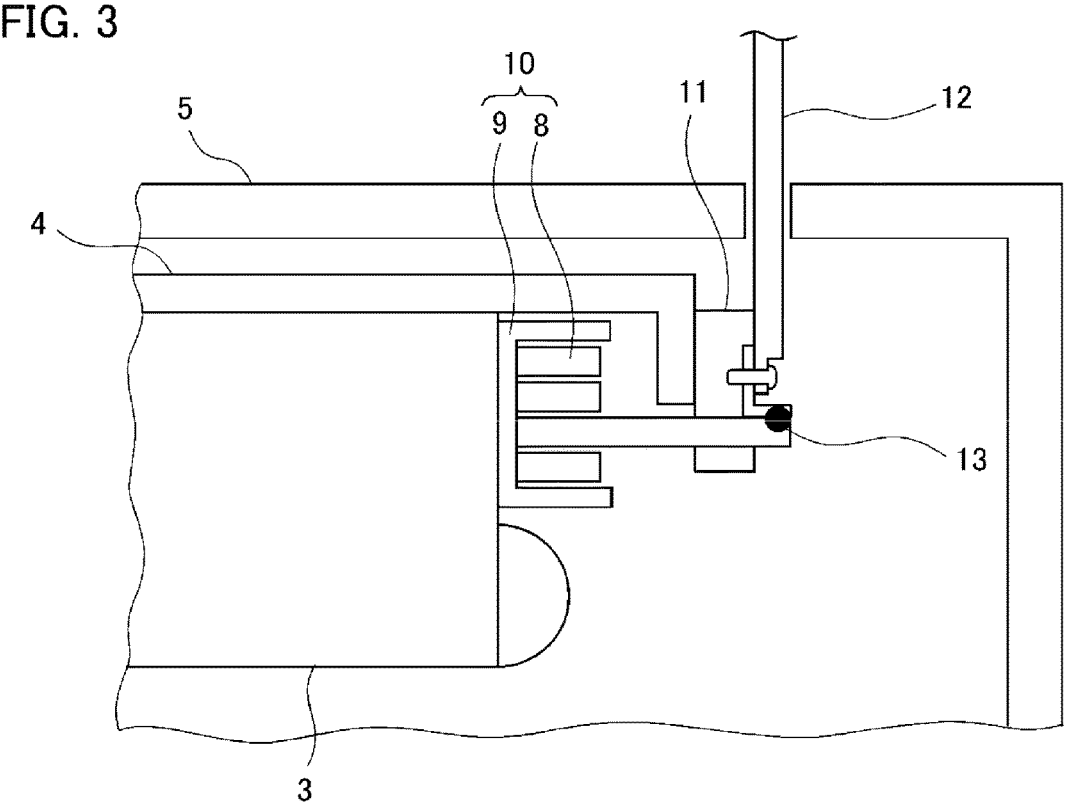
FIG. 3 is a partially enlarged cross section of the rotating electrical machine according to the first embodiment of the invention.

A rotating electrical machine according to a first embodiment of the invention will be described according to FIG. 1 through FIG. 3. FIG. 1 is a perspective view showing a configuration of the rotating electrical machine of the first embodiment. FIG. 2 is an axial cross section. FIG. 3 is a partially enlarged view of FIG. 2. Like portions are labeled with like reference numerals in the respective drawings referred to below. The rotating electrical machine includes a rotary driving shaft 1, a rotor 2 as a rotor provided on a peripheral surface of the shaft 1, and a stator 3 as a stator oppositely spaced apart from an outer peripheral surface of the rotor 2 by a predetermined interval.

The rotor 2 fixed to the peripheral surface of the shaft 1 has a rotor core provided with magnet storing holes (not shown) which are used to store permanent magnets and arranged in a circumferential direction. The stator 3 is held by a circular-cylindrical frame 4. The frame 4 and a terminal block 11 are stored in a case 5. Both ends of the shaft 1 are supported on the case 5 via bearings.

The stator 3 has a stator core 6 of an annular shape and a coil 7 is wound around the stator core 6. On an end face, the stator 3 has a connection plate 10 including a bus bar 8 connected to one end of the coil 7 wound around the stator core 6 and an insulating holder 9 holding a plurality of the bus bars 8 laminated in a radial direction. The bus bars 8 responsible for wiring processing of the coil 7 are made of a thick and rigid conductor, that is, a metal conductor, such as copper and aluminum.

The terminal block 11 has a connection terminal to which is welded the bus bars 8 extracted from the connection plate 10 and electrically connects outside wires 12 that supply the coil 7 with power and the bus bars 8. As is shown in FIG. 3, a feed terminal of the bus bar 8 extracted from the connection plate 10 is welded in a connection terminal (weld portion 13) fit to the terminal block 11 and electrically connected to a terminal of the outside wire 12, which is a three-phase cable. Owing to this configuration, a current is supplied to each of U, V, and W phases of the coil 7.

The terminal block 11 is fixed to the frame 4 holding the stator 3 and in phase with the stator 3. Meanwhile, a part of the outside wire 12 is fixed to the case 5. When configured in this manner, the feed terminal of the bus bar 8 extracted from the connection plate 10 is welded to the connection terminal of the terminal block 11 hardly under the influence of a tolerance caused by integration of components and a tolerance of assembly.

Even when a load applied from the outside gives rise to a phase difference between the case 5 and the frame 4, a tolerance can be absorbed by the outside wire 12. Hence, a load applied to the weld portion 13 of the connection terminal of the terminal block 11 and the bus bar 8 can be reduced. Further, when the business practice is to deliver the stator 3 alone, it is only necessary to attach the outside wire 12 to the stator 3 at the customer's end. Conversely, when the rotating electrical machine is broken apart, the stator 3 can be separated from the case 5 by merely removing the outside wire 12. In short, the handling becomes easier.

As has been described, according to the rotating electrical machine of the first embodiment, the terminal block 11 is in phase with the frame 4 and the stator 3. Hence, the feed terminal of the bus bar 8 is welded to the connection terminal of the terminal block 11 hardly under the influence caused by integration of components and the tolerance is eased. Accordingly, assembly becomes easier and the manufacturing costs can be reduced. In addition, because a part of the outside wire 12 is fixed to the case 5, even when a phase difference occurs between the case 5 and the frame 4, a tolerance can be absorbed by the outside wire 12. Hence, a load applied to the weld portion 13 of the terminal block 11 and the bus bar 8 can be reduced.

Second Embodiment

Figure 4:
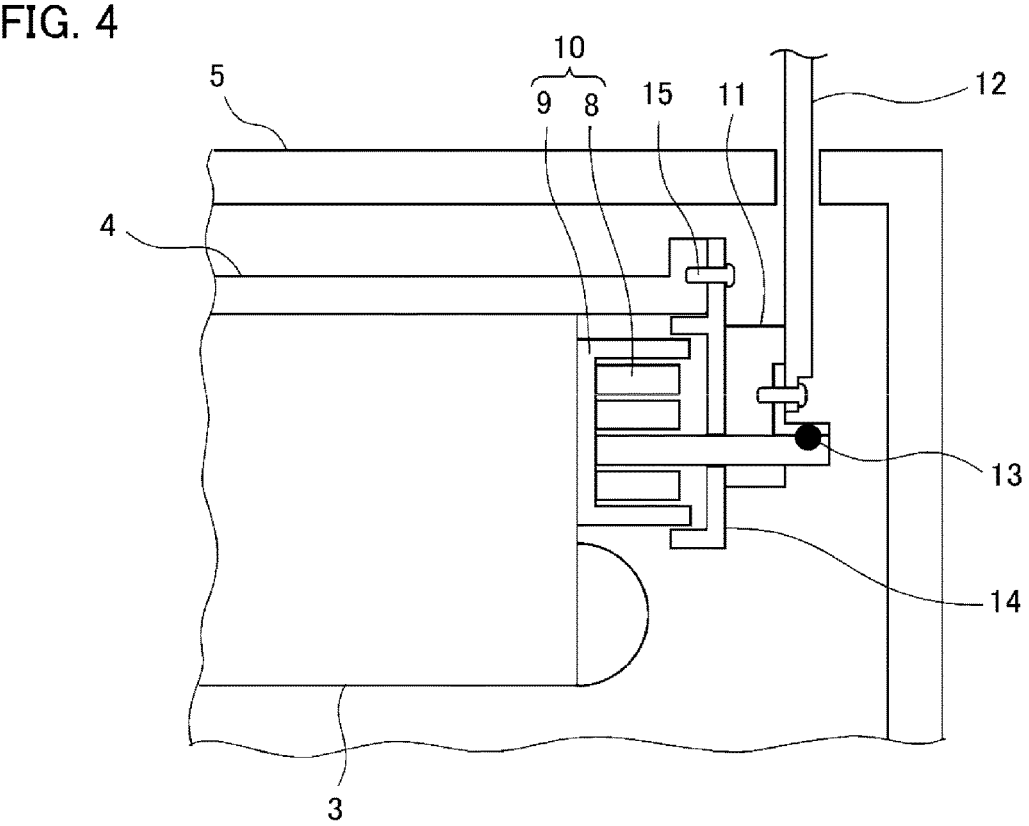
FIG. 4 is a partially enlarged cross section of a rotating electrical machine according to a second embodiment of the invention.

FIG. 4 is a partially enlarged cross section showing a configuration of a rotating electrical machine according to a second embodiment of the invention. The rotating electrical machine of the second embodiment has an annular connection plate cover 14 made of an insulating material and covering the connection plate 10. An overall configuration of the rotating electrical machine of the second embedment is the same as the configuration of the first embodiment above and a description is omitted herein (see FIG. 2).

The connection plate cover 14 is to ensure that the connection plate 10 and the coil 7 are insulated from outside environments and made of insulating resin, for example, polyphenylene sulfide (PPS) and nylon. The connection plate cover 14 is fixed to the frame 4 with bolts 15 and the terminal block 11 is fixed to the connection plate cover 14. In other words, the terminal block 11 is indirectly fixed to the frame 4 and the stator 3 via the connection plate cover 14. The terminal block 11 can be fixed to the frame 4 either directly as in the first embodiment above or indirectly via another component as in the second embodiment.

Figure 5:
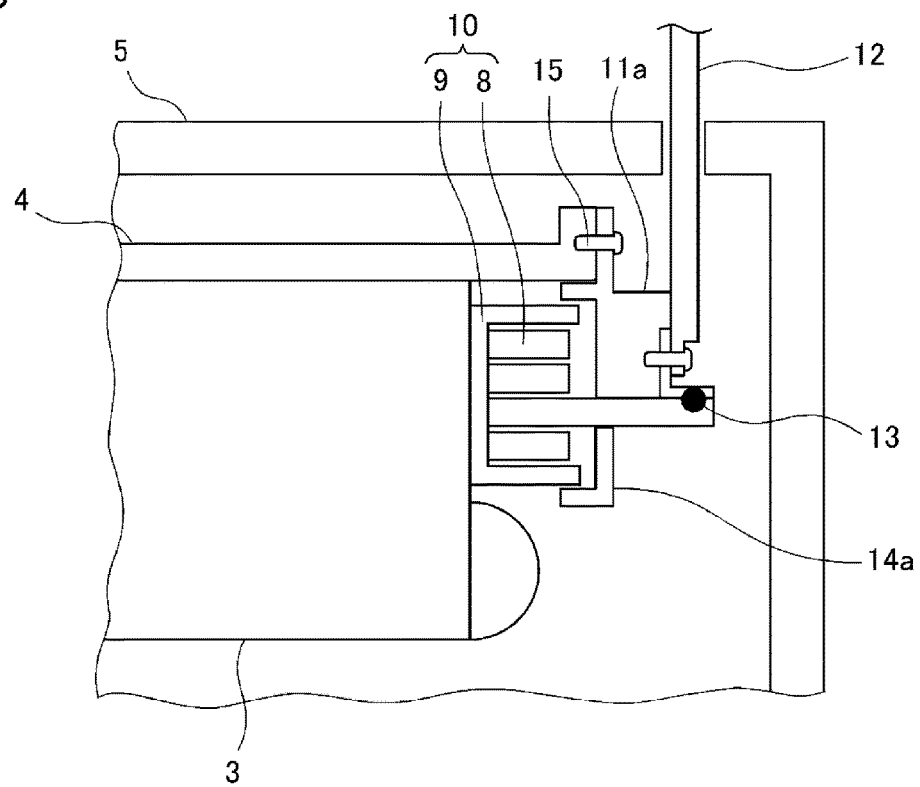
FIG. 5 is a partially enlarged cross section of a modification of the rotating electrical machine according to the second embodiment of the invention.

FIG. 5 shows a modification of the rotating electrical machine of the second embodiment. In this modification, a terminal block 11a is integrally molded with a connection plate cover 14a from the same resin and fixed to the frame 4 with the bolts 15.

According to the second embodiment, the connection plate cover 14 is provided. Hence, in addition to the advantageous effects of the first embodiment above, insulation of the coil 7 and the connection plate 10 from the outside environments can be ensured and the rotating electrical machine becomes more reliable. Further, the number of components can be reduced by integrally molding the terminal block 11a and the connection plate cover 14a. Consequently, not only can an assembly time be shorter and hence the manufacturing costs be reduced, but also an axial length of the rotating electrical machine can be shorter.

Third Embodiment

Figure 6:
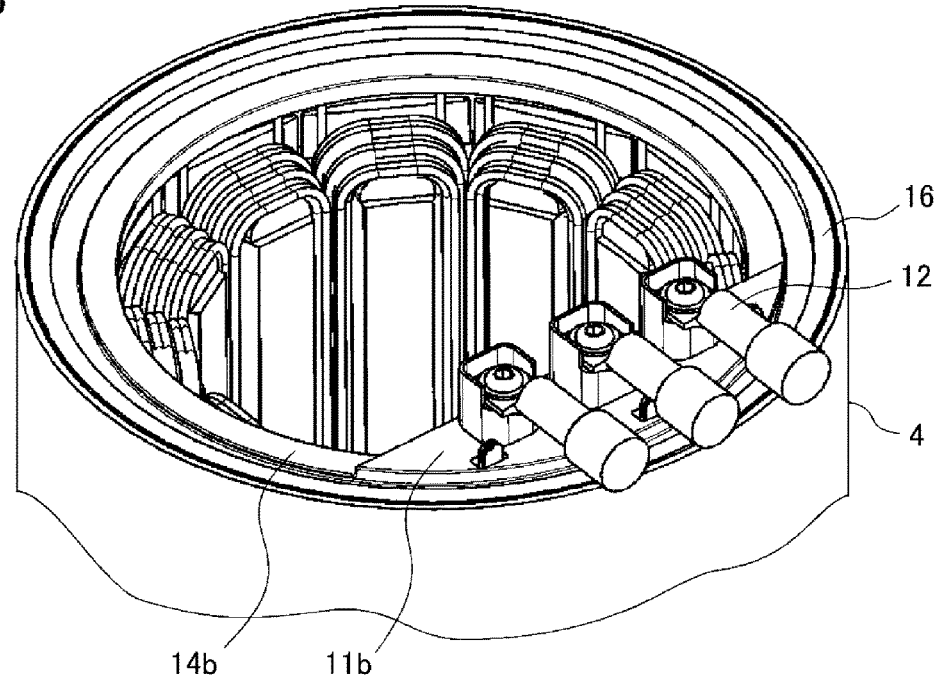
FIG. 6 is a perspective view of a rotating electrical machine according to a third embodiment of the invention.
Figure 7:
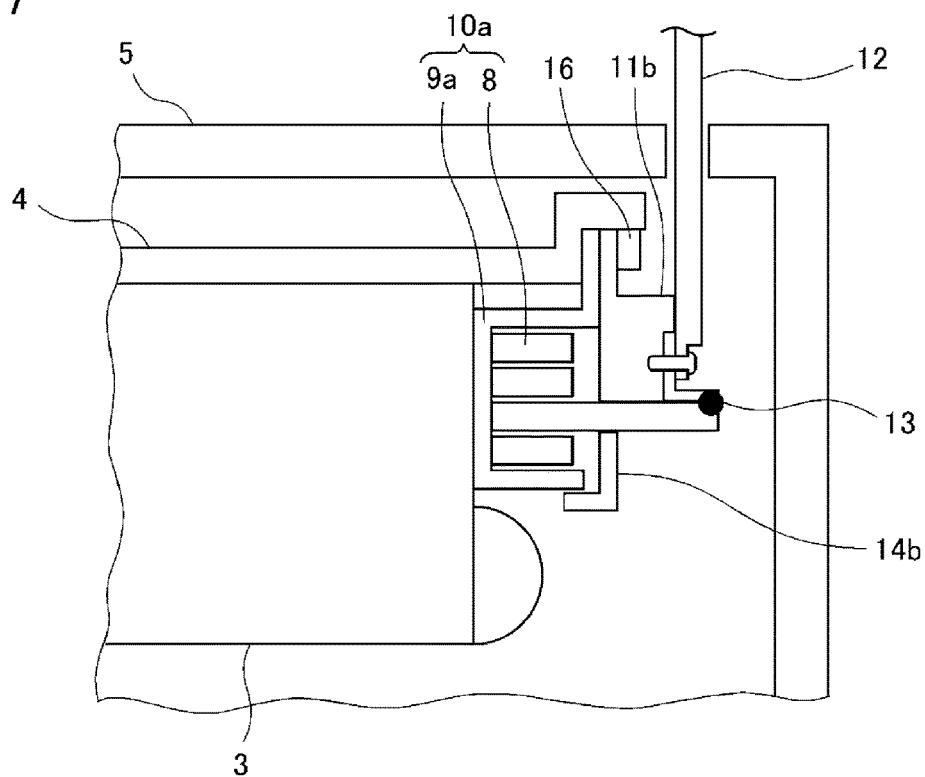
FIG. 7 is a partially enlarged cross section of the rotating electrical machine according to the third embodiment of the invention.

FIG. 6 is a perspective view showing a configuration of a rotating electrical machine according to a third embodiment of the invention. FIG. 7 is a partially enlarged cross section. In the third embodiment, a terminal block 11b together with a connection plate 10a and a connection plate cover 14b is fixed to the frame 4. An overall configuration of the rotating electrical machine of the third embedment is the same as the configuration of the first embodiment above and a description is omitted herein (see FIG. 2).

As is shown in FIG. 7, the connection plate cover 14b integrally molded with the terminal block 11b and an insulating holder 9a of the connection plate 10a are fixed to the frame 4 by an annular pressing member 16 press-fit inside the frame 4. The pressing member 16 is fit into the frame 4 in such a manner that the insulating holder 9a and the connection plate cover 14b are pressed against the frame 4. Owing to this configuration, the terminal block 11b integrally molded with the connection plate cover 14b is fixed to the frame 4 and the stator 3 together with the connection plate 10a.

Figure 8:
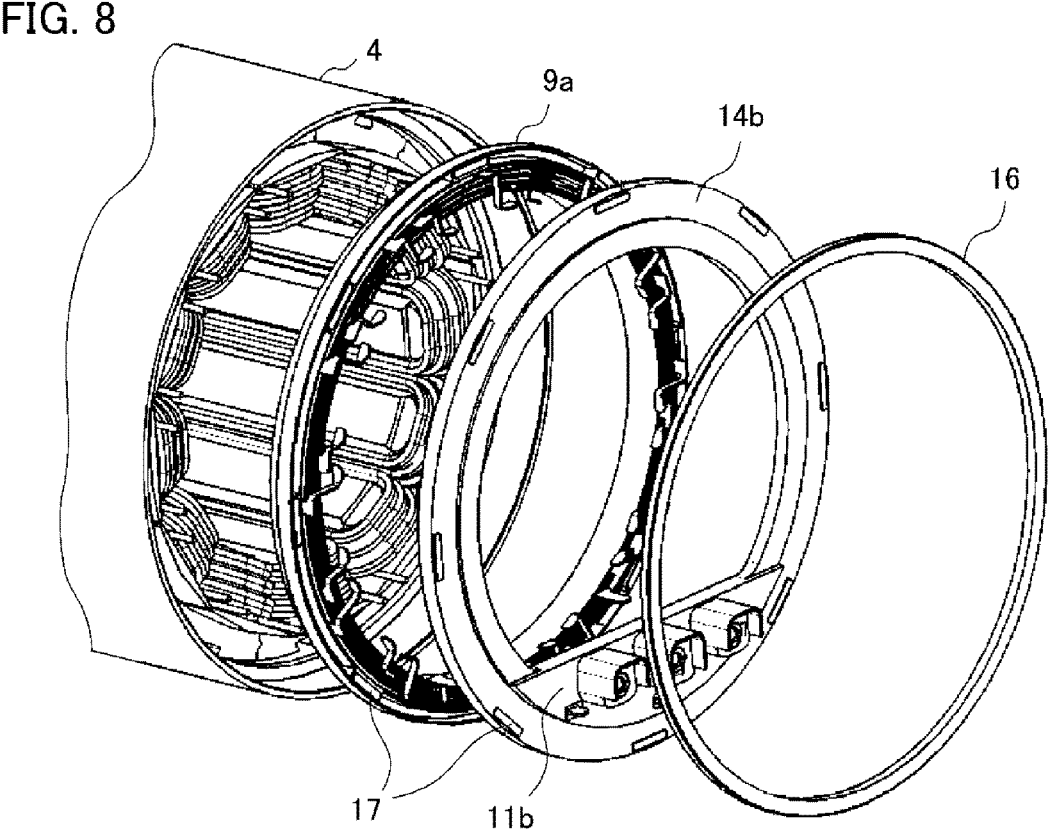
FIG. 8 is a partial perspective view of a modification of the rotating electrical machine according to the third embodiment of the invention.
Figure 9:
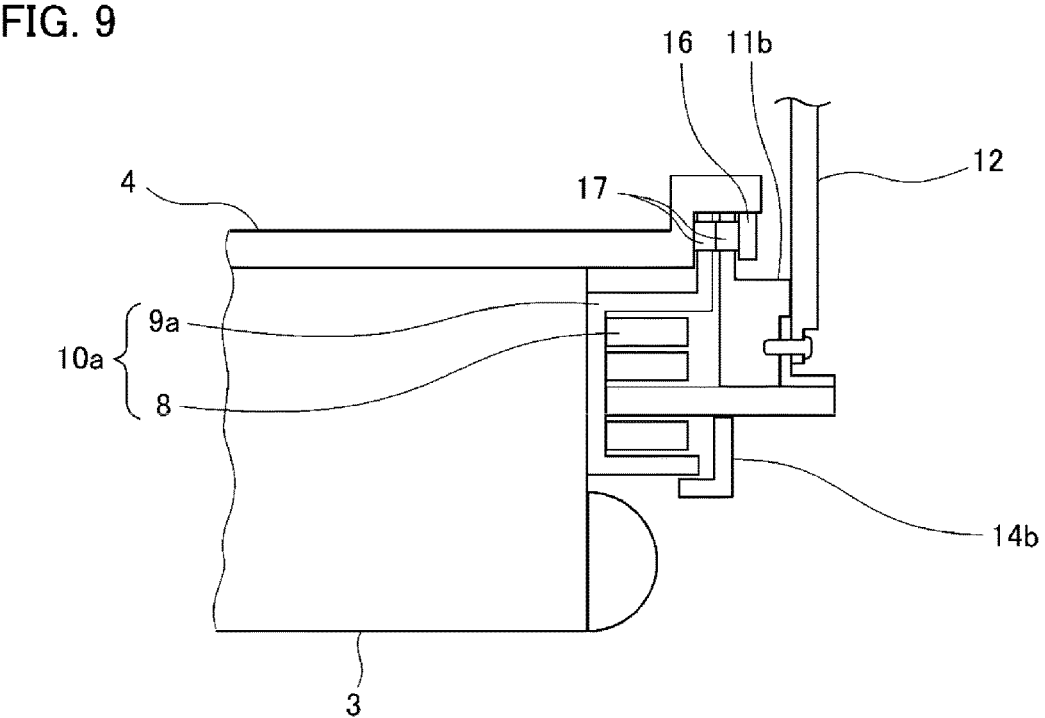
FIG. 9 is a partially enlarged cross section of the modification of the rotating electrical machine according to the third embodiment of the invention.

FIG. 8 and FIG. 9 show a modification of the rotating electrical machine of the third embodiment. In this modification, metal members 17 are inserted into the insulating holder 9a and the connection plate cover 14b so as to form a seating face of the pressing member 16. Owing to this configuration, setting caused by deterioration of resin can be prevented because the pressing member 16 does not directly press the insulating holder 9a and the connection plate cover 14b both made of resin. In the examples shown in FIG. 6 through FIG. 9, the block terminal 11b is integrally molded with the connection plate cover 14b. It should be appreciated, however, that the terminal block and the connection plate cover can be formed of different members.

According to the third embodiment, the terminal block 11b together with the connection plate 10a and the connection plate cover 14b is fixed to the frame 4, and this configuration eliminates the need to provide a mechanism that absorbs tolerances of components forming the connection plate 10a and the terminal block 11b and tolerances of components forming the coil 7 and the connection plate 10a. Hence, in addition to the advantageous effects of the first and second embodiments above, the manufacturing costs can be reduced. Further, because the connection plate 10a is fixed to the frame 4 and the stator 3, no load is applied to the weld portion of the coil 7 and the bus bars 8. Hence, strong joint can be obtained and the rotating electrical machine becomes more reliable.

Fourth Embodiment

Figure 10:
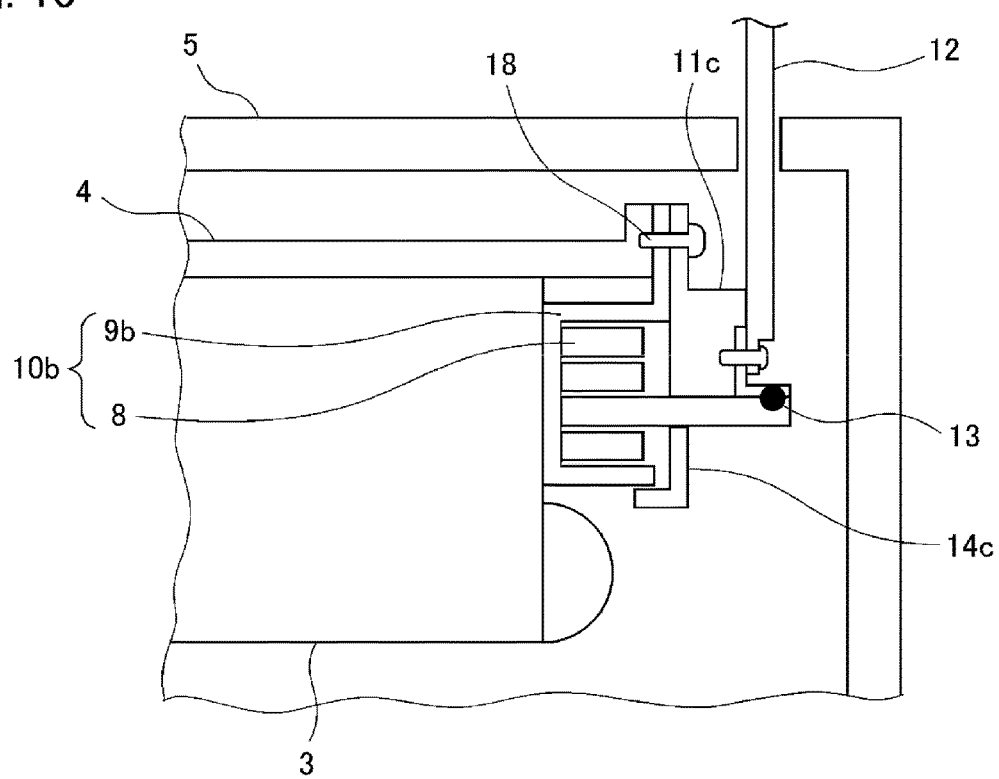
FIG. 10 is a partially enlarged cross section of a rotating electrical machine according to a fourth embodiment of the invention.

FIG. 10 is a partially enlarged cross section showing a configuration of a rotating electrical machine according to a fourth embodiment of the invention. In the fourth embodiment, a terminal block 11c is integrally molded with a connection plate cover 14c and fixed to the frame 4 together with an insulating holder 9b of the connection plate 10b as in the third embodiment above. It should be noted, however, that the pressing member 16 is omitted in the fourth embodiment and instead the connection plate cover 14c and the insulating holder 9b are fixed as the both are jointly fastened with bolts 18. An overall configuration of the rotating electrical machine of the fourth embedment is the same as the configuration of the first embodiment above and a description is omitted herein (see FIG. 2).

Figure 11:
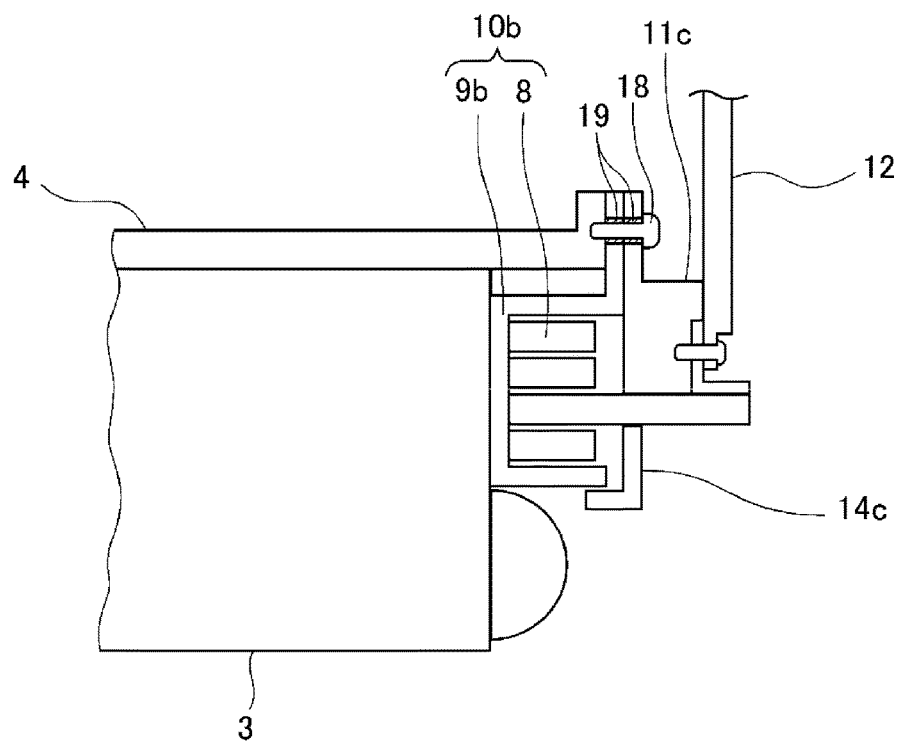
FIG. 11 is a partially enlarged cross section of a modification of the rotating electrical machine according to the fourth embodiment of the invention.

FIG. 11 shows a modification of the rotating electrical machine of the fourth embodiment. In this modification, metal members 19 are inserted into seating faces of the bolts 18 fastening the insulation holder 9b and the connection plate cover 14c. Owing to this configuration, setting caused by deterioration of resin can be prevented because the bolts 18 do not directly press the insulating holder 9b and the connection plate cover 14c both made of resin.

In the examples shown in FIG. 10 and FIG. 11, the terminal block 11c and the connection plate cover 14c are molded integrally. It should be appreciated, however, that the terminal block and the connection plate cover may be formed of different members. The fourth embodiment can also obtain advantageous effects same as those of the third embodiment above.

Fifth Embodiment

Figure 12:
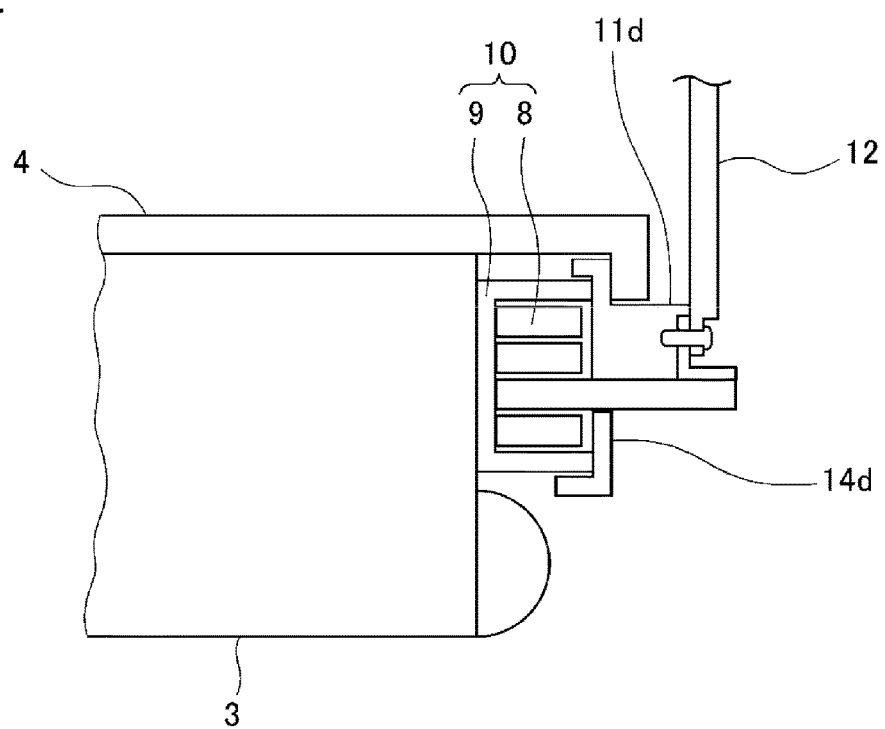
FIG. 12 is a partially enlarged cross section of a rotating electrical machine according to a fifth embodiment of the invention.

FIG. 12 is a partially enlarged cross section showing a configuration of a rotating electrical machine according to a fifth embodiment of the invention. In the fifth embodiment, a terminal block 11d together with the connection plate 10 and a connection plate cover 14d is sandwiched between the stator 3 and the frame 4. An overall configuration of the rotating electrical machine of the fifth embedment is the same as the configuration of the first embodiment above and a description is omitted herein (see FIG. 2).

In the rotating electrical machine of the fifth embodiment, the terminal block 11d and the connection plate 10 are sandwiched between the stator 3 and the frame 4 and thereby fixed in between. This fixing method enables all the operations involved in the welding to be completed before the stator 3 and the frame 4 are fixed. Hence, because the welding operation can be performed while the weight is light, the work efficiency can be enhanced. In addition, the number of the components can be reduced because the need for the fixing members, such as the pressing member 16 and the bolts 18, used, respectively, in the third and fourth embodiments above is eliminated.

FIG. 12 shows an example in which the terminal block 11d integrally molded with the connection plate cover 14d is sandwiched between the stator 3 and the frame 4 together with the connection plate 10. It should be appreciated, however, that the same advantageous effects can be obtained even when the terminal block is not integrally molded with the connection plate cover or the connection plate cover is omitted.

According to the fifth embodiment, the number of components can be reduced and the work efficiency can be enhanced in addition to the advantageous effects of the first through fourth embodiments above. It should be appreciated that the respective embodiments of the invention can be combined without any restriction and the respective embodiments can be modified or omitted as needed within the scope of the invention.

INDUSTRIAL APPLICABILITY

The invention can be used as a structure of a terminal block that connects a feed terminal of a rotating electrical machine to an outside wire.

The invention claimed is:
1. A rotating electrical machine, comprising:
   a rotor provided on a peripheral surface of a rotary driving shaft;

a stator oppositely spaced apart from an outer peripheral surface of the rotor and held inside a circular-cylindrical frame;

a connection plate having a bus bar connected to one end of a coil wound around the stator and an insulating holder, the bus bar including a plurality of bus bars laminated in a radial direction and the insulating holder holding a plurality of the bus bars;

a terminal block having a connection terminal to which is welded the bus bar extracted from the connection plate to electrically connect an outside wire that supplies the coil with power and the bus bar; and a case storing the frame and the terminal block; and an annular connection plate cover made of an insulating material and covering the connection plate, the rotating electrical machine being characterized in that:
   a part of the outside wire is fixed to the case and the terminal block is directly or indirectly fixed to the frame,
   the connection plate cover is fixed to the frame, and
   the terminal block together with the connection plate and the connection plate cover is sandwiched between the stator and the frame.

2. The rotating electrical machine according to claim 1, characterized in that:
the terminal block is fixed to the connection plate cover.

3. The rotating electrical machine according to claim 1, characterized in that:
the terminal block is integrally molded with the connection plate cover.

4. A rotating electrical machine, comprising:
a rotor provided on a peripheral surface of a rotary driving shaft;

a stator oppositely spaced apart from an outer peripheral surface of the rotor and held inside a circular-cylindrical frame;

a connection plate having a bus bar connected to one end of a coil wound around the stator and an insulating holder, the bus bar including a plurality of bus bars laminated in a radial direction and the insulating holder holding a plurality of the bus bars;

a terminal block having a connection terminal to which is welded the bus bar extracted from the connection plate to electrically connect an outside wire that supplies the coil with power and the bus bar;

a case storing the frame and the terminal block; and an annular connection plate cover made of an insulating material and covering the connection plate, the rotating electrical machine being characterized in that:
   a part of the outside wire is fixed to the case and the terminal block is directly or indirectly fixed to the frame, and
   the terminal block together with the connection plate and the connection plate cover is fixed to the frame by an annular pressing member press-fit inside the frame.

5. A rotating electrical machine, comprising:
a rotor provided on a peripheral surface of a rotary driving shaft;

a stator oppositely spaced apart from an outer peripheral surface of the rotor and held inside a circular-cylindrical frame;

a connection plate having a bus bar connected to one end of a coil wound around the stator and an insulating holder, the bus bar including a plurality of bus bars laminated in a radial direction and the insulating holder holding a plurality of the bus bars;

a terminal block having a connection terminal to which is welded the bus bar extracted from the connection plate to electrically connect an outside wire that supplies the coil with power and the bus bar; and a case storing the frame and the terminal block, the rotating electrical machine being characterized in that:
   a part of the outside wire is fixed to the case and the terminal block is directly or indirectly fixed to the frame, and
   the terminal block together with the connection plate is sandwiched between the stator and the frame.

* * * * *